(12) United States Patent
Buccella et al.

(10) Patent No.: US 9,582,100 B2
(45) Date of Patent: Feb. 28, 2017

(54) GENERATING DEVICE INPUT USING VIBRATIONS FROM SURFACE FEATURES

(71) Applicant: International Business Machines Corporation, Armonk, NY (US)

(72) Inventors: Christopher J. Buccella, Poughkeepsie, NY (US); Michael S. Chase-Salerno, New Paltz, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 98 days.

(21) Appl. No.: 14/315,719

(22) Filed: Jun. 26, 2014

(65) Prior Publication Data

US 2015/0378490 A1    Dec. 31, 2015

(51) Int. Cl.
*G06F 3/041*    (2006.01)
*G06F 3/043*    (2006.01)

(52) U.S. Cl.
CPC ............ *G06F 3/0416* (2013.01); *G06F 3/043* (2013.01)

(58) Field of Classification Search
CPC ....... G06F 3/0414; G06F 3/0416; G06F 3/043
USPC ...................................................... 345/173
See application file for complete search history.

(56) References Cited

U.S. PATENT DOCUMENTS

| | | | |
|---|---|---|---|
| 8,477,463 B2 | 7/2013 | Ms | |
| 8,498,631 B2 | 7/2013 | Li et al. | |
| 2006/0139339 A1* | 6/2006 | Pechman | G06F 3/03547 345/177 |
| 2009/0322695 A1* | 12/2009 | Cho | G06F 3/0416 345/173 |
| 2012/0270605 A1* | 10/2012 | Garrone | H04M 1/72563 455/566 |
| 2013/0076612 A1 | 3/2013 | Myers | |

* cited by examiner

*Primary Examiner* — Joseph Feild
*Assistant Examiner* — Chineyere Wills-Burns
(74) *Attorney, Agent, or Firm* — Garg Law Firm, PLLC; Rakesh Garg; Steven L. Bennett (57) ABSTRACT

A method, system, and computer program product for generating device input using vibrations from surface features are provided in the illustrative embodiments. In an electronic device (device), using a processor, a characteristic of a vibration is determined, the vibration being caused by motion of an object across the surface feature, the surface feature being a feature formed on an user-accessible surface of the device, the object makes a physical contact with the feature during the motion. A determination is made whether the characteristic is mapped to a command in the device. Responsive to the characteristic being mapped to the command, an instruction is generated to execute the command in the device. the instruction is sent to cause a function to be performed in the device.

19 Claims, 6 Drawing Sheets

GENERATING DEVICE INPUT USING VIBRATIONS FROM SURFACE FEATURES

TECHNICAL FIELD

The present invention relates generally to a method, system, and computer program product for interacting with an electronic device. More particularly, the present invention relates to a method, system, and computer program product for generating device input using vibrations from surface features.

BACKGROUND

Electronic devices often employ physical buttons as means for allowing users to provide inputs. Push-buttons, rotary knobs, and toggle switches are some examples of physical buttons. Physical buttons can take many other forms and require different corresponding physical movements to operate.

For example, presently available smartphones have buttons for adjusting the sound volume, powering the device up on down, and for several other functions. A user of the smartphone device depresses a button to input a command to cause the device to perform a function. Many other electronic devices similarly use buttons for these and other functions.

Many electronic devices, such as portable computing devices, smartphones, and others, now employ touch-sensitive interfaces, such as touch-screens. Many functions traditionally handled by buttons have been migrated to those touch-sensitive interfaces.

Removal of buttons and migration of their functions to a touch interface has allowed more seamless device enclosures, as fewer buttons are required than before. A few functions however, such as power and volume control, are still often implemented using buttons. These buttons require breaks and penetrations through the outer case, which can also become paths for dust or moisture to enter the case.

SUMMARY

The illustrative embodiments provide a method, system, and computer program product for generating device input using vibrations from surface features. An embodiment includes a method for generating an input using vibrations from a surface feature. The embodiment determines, in an electronic device (device), using a processor, a characteristic of a vibration, the vibration being caused by motion of an object across the surface feature, the surface feature being a feature formed on an user-accessible surface of the device, the object makes a physical contact with the feature during the motion. The embodiment determines whether the characteristic is mapped to a command in the device. The embodiment generates, responsive to the characteristic being mapped to the command, an instruction to execute the command in the device. The embodiment sends the instruction to cause a function to be performed in the device.

Another embodiment includes a computer usable program product comprising a computer readable storage device including computer usable code for generating an input using vibrations from a surface feature. The embodiment further includes computer usable code for determining, in an electronic device (device), using a processor, a characteristic of a vibration, the vibration being caused by motion of an object across the surface feature, the surface feature being a feature formed on an user-accessible surface of the device, the object makes a physical contact with the feature during the motion. The embodiment further includes computer usable code for determining whether the characteristic is mapped to a command in the device. The embodiment further includes computer usable code for generating, responsive to the characteristic being mapped to the command, an instruction to execute the command in the device. The embodiment further includes computer usable code for sending the instruction to cause a function to be performed in the device.

Another embodiment includes a data processing system for generating an input using vibrations from a surface feature. The embodiment further includes a storage device including a storage medium, wherein the storage device stores computer usable program code. The embodiment further includes a processor, wherein the processor executes the computer usable program code. The embodiment further includes computer usable code for determining, in an electronic device (device), using a processor, a characteristic of a vibration, the vibration being caused by motion of an object across the surface feature, the surface feature being a feature formed on an user-accessible surface of the device, the object makes a physical contact with the feature during the motion. The embodiment further includes computer usable code for determining whether the characteristic is mapped to a command in the device. The embodiment further includes computer usable code for generating, responsive to the characteristic being mapped to the command, an instruction to execute the command in the device. The embodiment further includes computer usable code for sending the instruction to cause a function to be performed in the device.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Within the scope of this disclosure, contact motion is a motion or movement of an object across a surface feature while the object is making contact with the surface feature. A surface feature includes, but is not limited to a texture or shape formed on the surface.

Grooves engraved into (but not cut through) or embossed over a surface of an enclosure of an electronic device are an example of a surface feature. Movement of a user's finger tip across the grooves is an example of a contact motion.

The grooves or other surface features can take any suitable shape or form, including but not limited to lines, geometric shapes, random patterns, or other suitable patterns. A user may perform a contact motion using a finger, a limb, an extension or projection from a limb, a tool, or an implement.

The contact motion can also be performed via or through clothing or other material intervening between the surface feature and the limb, extension, tool, implement, or another surface. Furthermore, the contact motion can be performed in any environment, e.g., while operating the device in air, submerged in water, or in vacuum.

The illustrative embodiments recognize that a desire for sleek and seamless designs for electronic device enclosures is limited by the present need for buttons and other protrusions from the enclosures. The illustrative embodiments further recognize that certain functions are cumbersome or undesirable on touch-sensitive interfaces and will continue to be more desirably implemented as buttons. For example, while touch-sensitive screens do allow for interesting and dynamic interfaces, functions implemented on touch-sensitive screens require visual attention of the user to locate, identify, and operate the interface. Buttons, on the other hand, are easily locatable by touching or feeling the device without the user having to pay visual attention to the device.

The illustrative embodiments recognize that while buttons and other similar interfaces are easier to operate, building the buttons and other such interfaces requires holes to be drilled or cuts to be made through the enclosure of the electronic device. Such holes or cuts reduce the mechanical strength of electronic device enclosures, harm the integrity of the enclosures against the elements, reduce the aesthetic appeal of the enclosure designs, and potentially allow dust, moisture, and debris to enter the enclosure.

Therefore, a method is needed that allows for providing inputs to electronic devices with the advantages of physical button-type interfaces, without requiring cuts or holes to be made through the enclosure, and without other drawbacks of physical buttons on electronic devices.

The illustrative embodiments used to describe the invention generally address and solve the above-described problems and other problems related to physical button interfaces on electronic device enclosures. The illustrative embodiments provide a method, system, and computer program product for generating device input using vibrations from surface features.

The following example describes the operation of an illustrative embodiment. Within the scope of the illustrative embodiments, the operations of the various embodiments can be modified according to the surface feature used, contact motion made, objects or surface used to make the contact motion, or the environment in which the contact motion is made.

Assume for example, that a surface of an electronic device enclosure has a chevron pattern surface feature embossed on a portion of the surface. A contact motion, such as stroking with a user's finger over the chevrons, produces corresponding vibrations in the enclosure.

Furthermore, the vibrations resulting from the contact motion relative to the surface feature change depending on many factors. A contact motion in one direction over a surface feature produces vibrations with one characteristic, e.g., a specific frequency, rhythm, pattern, waveform, or a combination thereof. A contact motion in another direction over the same surface feature produces vibrations with a different characteristic, e.g., a different frequency, rhythm, pattern, waveform, or a combination thereof. Similarly, different vibrations with different characteristics are produced by different surface features, different pressure or speed of contact motions, different users making the contact motions, condition of the surface of the surface feature, environmental condition where the device is being operated, manufacturing variations in the surface or surface features, implements or materials used to make the contact motion over the surface feature, and numerous other factors and combinations thereof.

Even if such vibrations are imperceptible to humans, a sensitive enough transducer in the enclosure can detect the vibrations. Furthermore, any ambient sounds or vibrations can be distinguished and separated from the vibrations resulting from the contact motion by use of presently available technology, for example, the technology used in noise-cancellation headsets.

An embodiment detects the vibrations. The embodiment identifies a characteristic, e.g., a frequency, of the vibration. The embodiment identifies a command for the electronic device based on the characteristic. The embodiment generates a command instruction corresponding to the command. The embodiment sends the command instruction to another application, e.g., the operating system or another application executing in the electronic device, to carry out a function of the electronic device, e.g., decrease the audio volume output of the device.

An embodiment forms the correspondence between various vibrations and various commands through training or calibration. For example, an embodiment allows a user to configure the electronic device such that a particular contact motion over a particular surface feature is associated with a particular feature of the electronic device.

Any number of surface features may be present on one or more surfaces of the enclosure of the electronic device. Different contact motions of varying types can be made over the same surface feature to cause different functions. For example, a circular contact motion over chevrons produces different vibrations than a linear contact motion over the same chevrons. During training, an embodiment associates a combination of a surface feature and a contact motion relative thereto with a command to cause a function in the electronic device.

Another embodiment allows re-calibration of contact motions, resulting vibrations, resulting associations with commands, or a combination thereof. For example, wear and tear of the surface features, a change in the operating environment of the device, a different user using the device, and many other factors may cause the recalibration to improve the accuracy of interpretation of the vibrations.

The illustrative embodiments are described with respect to certain surface features, materials, contact motions, commands, functions, algorithms, forms of data, data processing systems, environments, components, and applications only as examples. Any specific manifestations of such artifacts are not intended to be limiting to the invention. Any suitable manifestation of data processing systems, environments, components, and applications can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 1:
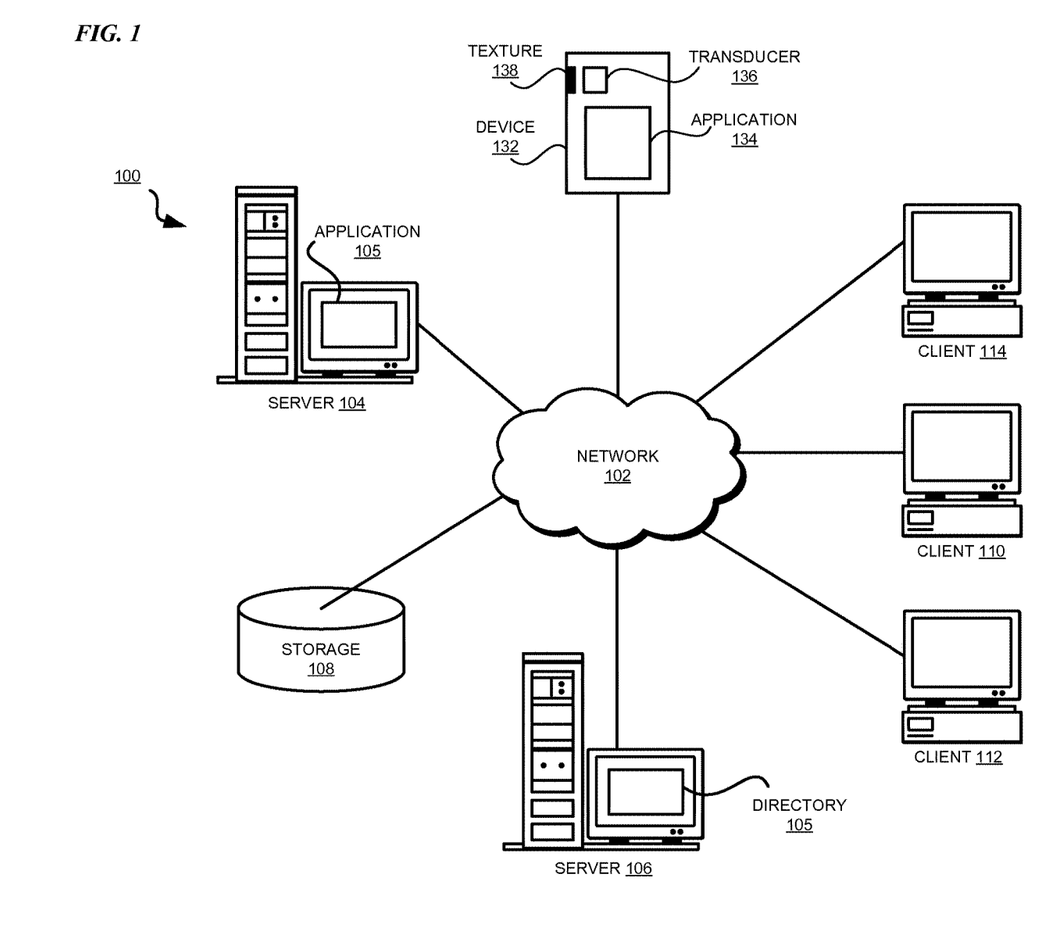
FIG. 1 depicts a block diagram of a network of data processing systems in which illustrative embodiments may be implemented.
Figure 2:
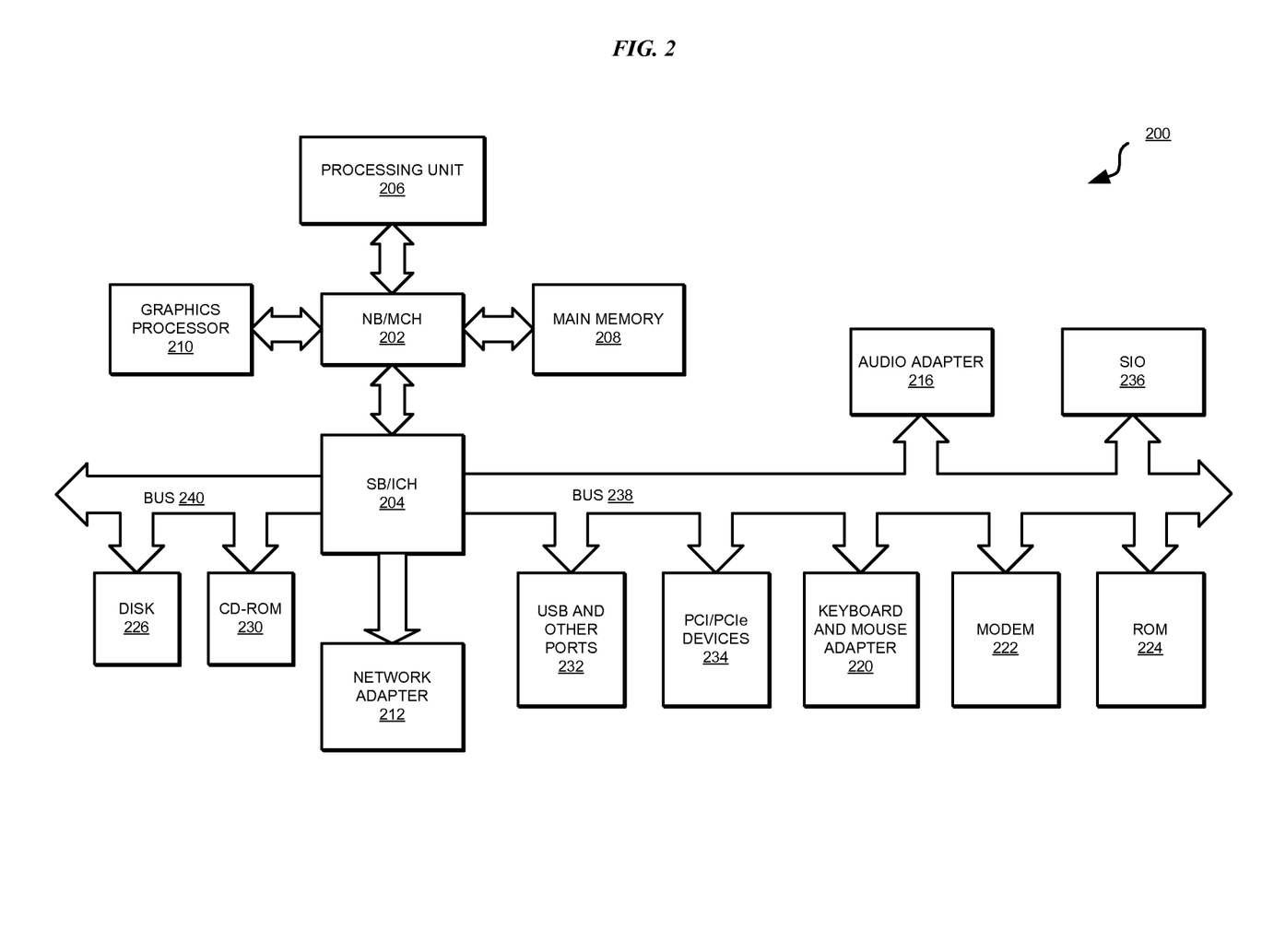
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables. Server 104 and server 106 couple to network 102 along with storage unit 108. Software applications may execute on any computer in data processing environment 100.

In addition, clients 110, 112, and 114 couple to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an embodiment. For example, Device 132 is any suitable electronic device, for example, a smartphone, tablet computer, a portable data processing device, or a wearable computing device, where a prior art physical button is replaced in accordance with an illustrative embodiment. Device 132 includes application 134, which implements an embodiment described herein. Device 132 further includes transducer 136 and surface feature 138. Transducer 136 detects the vibrations produced when a contact motion is made on surface feature 138. Transducer 136 converts the vibrations into a suitable signal from which the characteristics of the vibrations are discernible. Other computers, such as server 104 or client 112, can be used to configure device 132, update device 132, operate in accordance with a function of device 132, store data from device 132, or perform other suitable functions with device 132 over network 102. For example, various pre-programmed associations between certain contact motions, certain surface features, and certain commands may be available on server 104. A user can omit the training step according to an embodiment described elsewhere, prior to using device 132 and surface feature 138 by downloading from server 104 to device 132 such pre-programmed associations. Training or calibration data generated on device 132 can similarly be stored, e.g., in storage 108, for future use.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as server 104 or client 110 in FIG. 1, or another type of device in which computer usable program code or instructions implementing the processes may be located for the illustrative embodiments. Data processing system 200 is also representative of an electronic device, such as device 132 in FIG. 1 in which computer usable program code or instructions implementing the processes of the illustrative embodiments may be located for the illustrative embodiments. Data processing system 200 is also representative of an embedded, removable, or mobile computing device, such as an example implementation of device 132. Data processing system 200 is described as a computer only as an example, without being limited thereto. Implementations in the form of device 131, 134, 136, or automobile 133 in FIG. 1 may modify data processing system 200 and even eliminate certain depicted components there from without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), or Linux® (Linux is a trademark of Linus Torvalds in the United States and other countries). An object oriented programming system, such as the Java™ programming system, may run in conjunction with the operating system and provides calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications or programs, such as application 105, load balancer 107, algorithms 109, and rules 111 in FIG. 1, are located on storage devices, such as hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
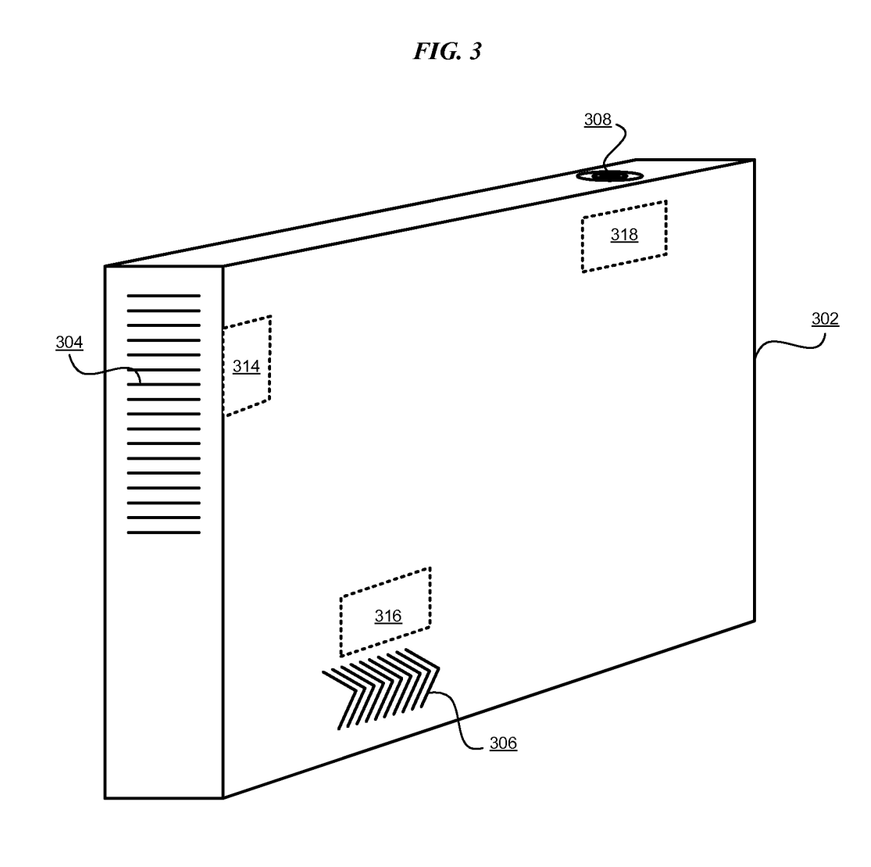
FIG. 3 depicts a block diagram of an electronic device configured with generating device input using vibrations from surface features in accordance with an illustrative embodiment.

With reference to FIG. 3, this figure depicts a block diagram of an electronic device configured with generating device input using vibrations from surface features in accordance with an illustrative embodiment. Device 302 is an example of device 132 in FIG. 1 together with the device's enclosure. Figure artifacts drawn in solid lines are present on the enclosure of device 302, and figure artifacts drawn in dotted lines are present inside the enclosure of device 302.

Surface features 304, 306, and 308 are example surface features incorporated on the enclosure of device 302. Only as examples and without implying any limitation thereto on the illustrative embodiments, surface features 304, 306, and 308 depict certain example shapes that can be formed into or onto the enclosure of device 302.

One or more transducers are configured in device 302 to detect the vibrations from contact motion over one or more of surface features 304, 306, or 308. For example, transducer 314 is configured to detect the vibrations from contact motion over surface feature 304, transducer 316 is configured to detect the vibrations from contact motion over surface feature 306, and transducer 318 is configured to detect the vibrations from contact motion over surface feature 308.

Note that a transducer can be configured to detect vibrations from more than one surface features and a transducer need not be dedicated to a single surface feature in a one-to-one relationship. Furthermore, the illustrative embodiments place no restriction on the relative locations of a surface feature on the enclosure of device 302 and a corresponding transducer within device 302.

In some cases, it may be advantageous to mount a transducer, e.g., transducer 314, to the same surface on which a surface feature, e.g., feature 304, appears. Such a configuration may enhance the detection of faint vibrations through solid material of the enclosure. In some other cases, it may be advantageous to mount a transducer, e.g., transducer 318, elsewhere in device 302. Such a configuration may facilitate the detection of vibrations from multiple surface features through the enclosed and encapsulated environment within device 302.

Figure 4:
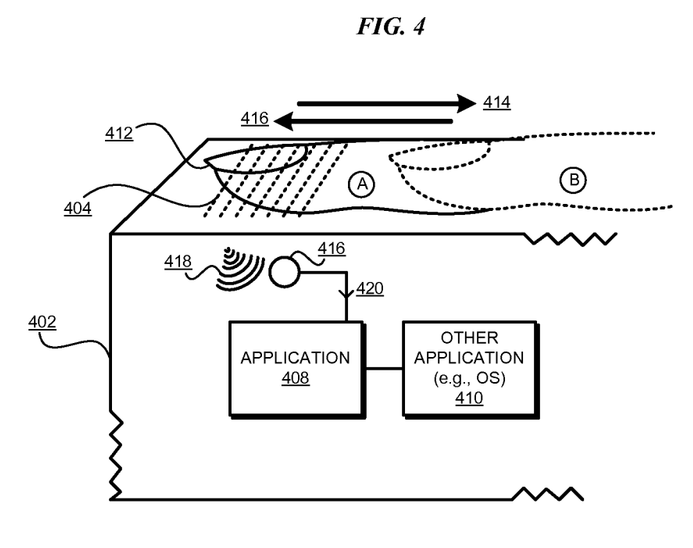
FIG. 4 depicts a block diagram of a configuration to use generating device input using vibrations from surface features in accordance with an illustrative embodiment.

With reference to FIG. 4, this figure depicts a block diagram of a configuration to use generating device input using vibrations from surface features in accordance with an illustrative embodiment. Device 402 is an example of device 302 in FIG. 3.

Surface feature 404 is an example of any of surface features 304, 306, or 308 in FIG. 3, and is located on the user-accessible side of a surface of the enclosure of device 402. Transducer 406 is an example of any of transducers 314, 316, or 318 in FIG. 3. Application 408 is an example of application 134 in FIG. 1. Other application 410 is another application, e.g., an operating system, executing in device 402. Transducer 408 is located within the enclosure of device 402. Application 408 and other application 410 execute within device 402.

User's finger 412 is depicted as the implement used to perform a contact motion using surface feature 404. Contact motion 414 causes finger 412 to move, while in contact with surface feature 404, from position A to position B as shown. Contact motion 416 causes finger 412 to move, while in contact with surface feature 404, from position B to position A as shown. Contact motions 414 and 416 produce different vibrations as detected by transducer 406.

In an example operation of an embodiment, the user performs contact motion 414 using finger 412 across surface feature 404. Contact motion 414 generates vibrations 418 within the enclosure of device 402. Transducer 406 detects vibrations 418 and produces corresponding signal 420. Signal 420 forms an input to application 408. When signal 420 indicates a characteristic of vibration 418 that matches a certain command, application 408 generates and sends instructions to have that matching command executed by other application 410. Other application 410 causes a function corresponding to the command instructions from application 408 to occur on device 402.

Figure 5:
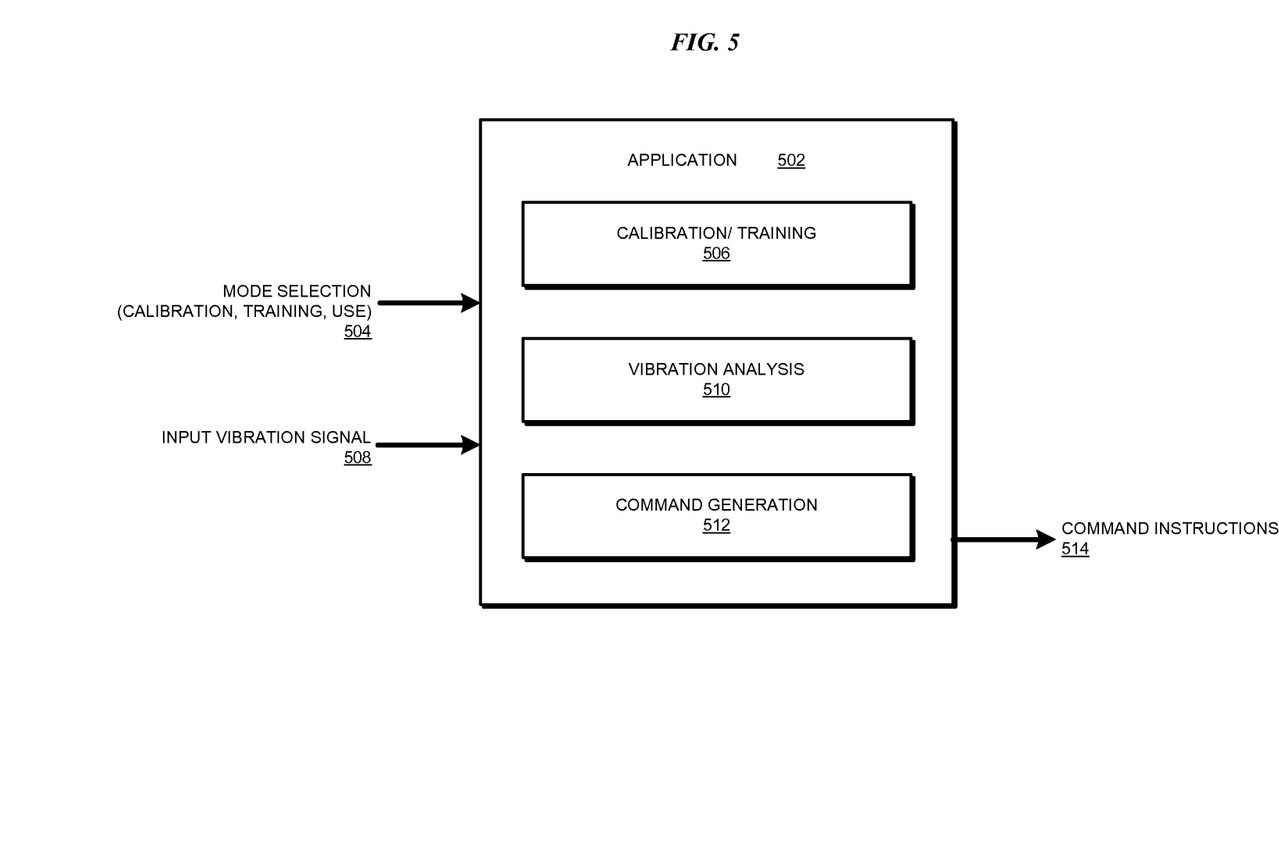
FIG. 5 depicts a block diagram of an application for generating device input using vibrations from surface features in accordance with an illustrative embodiment.

With reference to FIG. 5, this figure depicts a block diagram of an application for generating device input using vibrations from surface features in accordance with an illustrative embodiment. Application 502 is an example of application 408 in FIG. 4.

Application 502 optionally receives input 504. Input 504 indicates the application 502 whether the user intends to train or calibrate the device where application 502 executes, or the user intends to use application 502 in a pre-trained or pre-calibrated device. Absent input 504, application 502 assumes the latter and operates accordingly. If input 504 indicates a calibration or training mode selection by the user, component 506 performs the calibration of contact motions, and forms or revises associations between various vibrations and the available functions of the device as describe elsewhere in this disclosure.

Application 502 receives a vibration signal as input 508. Signal 420 in FIG. 4 is an example of input 508. Component 510 analyzes the vibrations to determine one or more characteristics of the input that caused the signal to be generated. Component 510 determines whether those one or more characteristics match with, correspond to, or are mapped to any command in the device. If component 510 finds such a correspondence or mapping, component 512 generates instructions 514 for that command to be executed in the device. Application 502 sends, such as from component 512, command instructions 514 to a suitable application, e.g., other application 410 in FIG. 4, to perform a function in the device.

Figure 6:
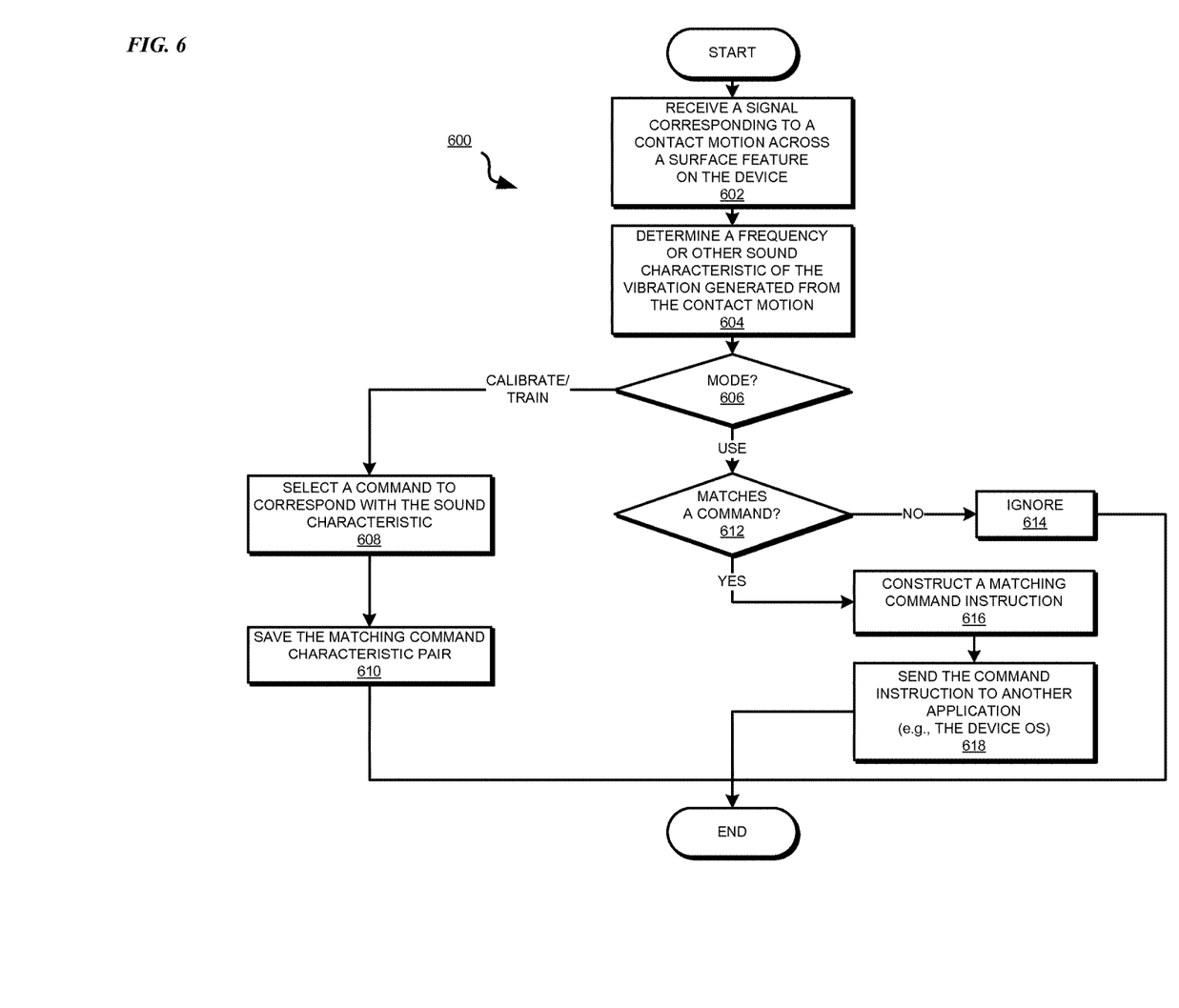
FIG. 6, this figure depicts a flowchart of a process for generating device input using vibrations from surface features in accordance with an illustrative embodiment.

With reference to FIG. 6, this figure depicts a flowchart of a process for generating device input using vibrations from surface features in accordance with an illustrative embodiment. Process 600 can be implemented in application 502 in FIG. 5.

The application receives a signal corresponding to a contact motion across a surface feature on the device (block 602). The application determines a characteristic, e.g., a frequency or another characteristic, of the vibration that was generated from the contact motion (block 604).

The application determines whether the process 600 is to operate in a calibration/training mode or a normal use mode (block 606). If operating in calibration or training mode ("Calibrate/train" path of block 606), the application selects a command to correspond with the characteristic (block 608). The application saves the matching command-characteristic pair as stored data for future use during normal use operations (block 610). The application ends process 600 thereafter.

If operating in normal use mode ("Use" path of block 606), the application determines whether the characteristic matches a command in the stored data of matching command-characteristic pairs (block 612). If the application does not find a match ("No" path of block 612), the application ignore the signal as perhaps an aberration or unintended contact with the surface feature (block 614). The application ends process 600 thereafter.

If the application finds a match ("Yes" path of block 612), the application constructs a matching command instruction (block 616). The application sends the command instruction to another application as described elsewhere in the disclosure (block 618). The application ends process 600 thereafter.

Thus, a computer implemented method, system, and computer program product are provided in the illustrative embodiments for generating device input using vibrations from surface features.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for generating an input using vibrations from a surface feature, the method comprising: sensing, in an electronic device, using a processor, a combined vibration, wherein the combined vibration includes an ambient sound and a vibration caused by a motion of an object across the surface feature;
   separating from the combined vibration the vibration;
   determining, in the device, a characteristic of the vibration, the surface feature being a feature formed on a user-accessible surface of the device, the object makes a physical contact with the feature during the motion;
   determining whether the characteristic is mapped to a command in the device;
   generating, responsive to the characteristic being mapped to the command, an instruction as the input to execute the command in the device;
   sending the instruction to cause a function to be performed in the device;
   detecting, using a hardware transducer in the device, a second, the second vibration being caused by a second motion of a second object across the surface feature;
   generating a signal corresponding to the second vibration;
   determining a second characteristic of the second vibration caused using the surface feature; and
   re-calibrating the input by mapping the second characteristic to the command in the device.

2. The method of claim 1, further comprising:
   receiving an indication that the vibration is for training;
   receiving a selection, wherein the selection selects the command;

forming a mapping between the command to the characteristic; and saving the mapping, wherein the mapping is used in the determining whether the characteristic is mapped to the command in the device.

3. The method of claim 1, wherein a wear and tear of the surface feature causes the second vibration from the second motion.

4. The method of claim 1, further comprising: determining that a change in an operating environment of the device has caused the second vibration from the second motion.

5. The method of claim 1, further comprising:
determining, in the device, a second characteristic of a second vibration;
determining whether the second characteristic is mapped to a second command in the device;
ignoring, responsive to the second characteristic not being mapped to the second command, the second vibration.

6. The method of claim 1, wherein the surface feature comprises a texture that is formed on the user-accessible surface of the device without cutting through the surface, wherein a circular motion of the object across the feature generates a first vibration with a first characteristic and a linear motion of the object across the feature generates a second vibration with a second characteristic.

7. The method of claim 6, wherein the surface feature comprises a shape embossed on the surface.

8. The method of claim 1, wherein the vibration results from a change in the physical contact between the object and the surface feature, due to a physical shape of the feature, during the motion.

9. A computer usable program product comprising a computer readable storage device including computer usable code for generating an input using vibrations from a surface feature, the computer usable code comprising: computer usable code for sensing, in an electronic device, using a processor, a combined vibration, wherein the combined vibration includes an ambient sound and a vibration caused by a motion of an object across the surface feature; computer usable code for separating from the combined vibration the vibration;
computer usable code for determining, in the device a characteristic of the vibration, the surface feature being a feature formed on a user-accessible surface of the device, the object makes a physical contact with the feature during the motion;
computer usable code for determining whether the characteristic is mapped to a command in the device;
computer usable code for generating, responsive to the characteristic being mapped to the command, an instruction as the input to execute the command in the device; and
computer usable code for sending the instruction to cause a function to be performed in the device;
detecting, using a hardware transducer in the device, a second, the second vibration being caused by a second motion of a second object across the surface feature;
generating a signal corresponding to the second vibration;
determining a second characteristic of the second vibration caused using the surface feature; and
re-calibrating the input by mapping the second characteristic to the command in the device.

10. The computer usable program product of claim 9, further comprising:
computer usable code for receiving an indication that the vibration is for training;
computer usable code for receiving a selection, wherein the selection selects the command;
computer usable code for forming a mapping between the command to the characteristic; and
computer usable code for saving the mapping, wherein the mapping is used in the determining whether the characteristic is mapped to the command in the device.

11. The computer usable program product of claim 9, further comprising:
computer usable code for detecting, using a hardware transducer in the device, the vibration; and generating a signal corresponding to the vibration.

12. The computer usable program product of claim 9, wherein the characteristic is a frequency of the vibration.

13. The computer usable program product of claim 9, further comprising:
computer usable code for receiving a signal resulting from the vibration; and analyzing the signal to determine the characteristic of the vibration.

14. The computer usable program product of claim 9, further comprising:
computer usable code for determining, in the device, a second characteristic of a second vibration;
computer usable code for determining whether the second characteristic is mapped to a second command in the device;
computer usable code for ignoring, responsive to the second characteristic not being mapped to the second command, the second vibration.

15. The computer usable program product of claim 9, wherein the surface feature comprises a texture that is formed on the user-accessible surface of the device without cutting through the surface, wherein a first motion of the object in a first direction across the feature generates a first vibration with a first characteristic and a second motion of the object in a second direction across the feature generates a second vibration with a second characteristic.

16. The computer usable program product of claim 15, wherein the surface feature comprises a shape embossed on the surface.

17. The computer usable program product of claim 9, wherein the computer usable code is stored in a computer readable storage medium in a data processing system, and wherein the computer usable code is transferred over a network from a remote data processing system.

18. The computer usable program product of claim 9, wherein the computer usable code is stored in a computer readable storage medium in a server data processing system, and wherein the computer usable code is downloaded over a network to a remote data processing system for use in a computer readable storage medium associated with the remote data processing system.

19. A data processing system for generating an input using vibrations from a surface feature, the data processing system comprising:
a storage device including a storage medium, wherein the storage device stores computer usable program code; and a processor, wherein the processor executes the computer usable program code, and wherein the computer usable program code comprises: computer usable code for sensing, in an electronic device, using a processor, a combined vibration, wherein the combined vibration includes an ambient sound and a vibration caused by a motion of an object across the surface feature;
computer usable code for separating from the combined vibration the vibration;

computer usable code for determining, in the device a characteristic of the vibration, the surface feature being a feature formed on a user-accessible surface of the device, the object makes a physical contact with the feature during the motion;

computer usable code for determining whether the characteristic is mapped to a command in the device; computer usable code for generating, responsive to the characteristic being mapped to the command, an instruction as the input to execute the command in the device; and computer usable code for sending the instruction to cause a function to be performed in the device;

detecting, using a hardware transducer in the device, a second, the second vibration being caused by a second motion of a second object across the surface feature;

generating a signal corresponding to the second vibration; determining a second characteristic of the second vibration caused using the surface feature; and re-calibrating the input by mapping the second characteristic to the command in the device.

\* \* \* \* \*